United States Patent [19]
Goto

[11] Patent Number: 5,291,343
[45] Date of Patent: Mar. 1, 1994

[54] AUDIO/VIDEO SYSTEM FOR TELEVISION RECEIVER, VIDEO CASSETTE RECORDER, AND SO FORTH

[75] Inventor: Takeshi Goto, Hirakata, Japan

[73] Assignee: Matsushita Electric Industrial Co., Ltd., Osaka, Japan

[21] Appl. No.: 8,883

[22] Filed: Jan. 21, 1993

Related U.S. Application Data

[63] Continuation of Ser. No. 441,536, Nov. 27, 1989, abandoned.

[30] Foreign Application Priority Data

Dec. 1, 1988 [JP] Japan ................................. 63-304896
Sep. 11, 1989 [JP] Japan ................................. 1-235049

[51] Int. Cl.$^5$ .......................... H04N 5/78; H04N 5/76
[52] U.S. Cl. ...................... 360/33.1; 358/335; 348/731; 348/734
[58] Field of Search ................ 360/33.1, 19.1, 9.1, 360/31, 79; 358/86, 188, 190, 194.1, 335, 191.1, 310, 181; 340/825.08; 455/4, 5

[56] References Cited

U.S. PATENT DOCUMENTS

| | | | |
|---|---|---|---|
| 4,475,153 | 10/1984 | Kihara et al. | 358/335 |
| 4,998,245 | 3/1991 | Tanaka et al. | 340/825.08 |
| 5,047,867 | 9/1991 | Strubbe et al. | 358/335 |

FOREIGN PATENT DOCUMENTS

| | | |
|---|---|---|
| 58-012483 | 1/1983 | Japan . |
| 61-074473 | 4/1986 | Japan . |
| 63-076586 | 4/1988 | Japan . |
| 2218274 | 11/1989 | United Kingdom . |

OTHER PUBLICATIONS

Herskovis, "Control Arrangement and Method For Video Tape Recorder," Research Disclosure, No. 243, pp. 314–320, Jul. 1984.

*Primary Examiner*—Andrew L. Sniezek
*Attorney, Agent, or Firm*—Stevens, Davis, Miller & Mosher

[57] ABSTRACT

An audio/video system provides communication control units on both a TV (television receiver) and a VCR (video cassette recorder) and includes an information path connected between both for executing data communications therebetween. When the VCR starts its "play" operation, the system automatically turns the TV on and makes an inquiry regarding a connecting method between the TV and the VCR (i.e., whether the connection is an AV-connection or an RF-connection) for controlling the TV according to an input mode matched to the connecting method. When the VCR starts its "record" operation while a user is currently watching the TV, the system turns the VCR on and then matches a channel number selected on a tuner built in the VCR to a channel selected on the TV.

4 Claims, 11 Drawing Sheets

AUDIO/VIDEO SYSTEM FOR TELEVISION RECEIVER, VIDEO CASSETTE RECORDER, AND SO FORTH

This application is a continuation of application Ser. No. 07/441,536, filed Nov. 27, 1989 (abandoned).

BACKGROUND OF THE INVENTION

The present invention relates to an application function in an audio/video system comprising a television receiver (hereinafter referred to as a TV), a video cassette recorder (hereinafter referred to as a VCR) and so forth being interconnected as an integrated system.

Traditionally, an audio/video system comprising both a TV and a VCR has not provided any function of controlling the component equipment items or inquiring as to the states of those equipment items with respect to one another. It has resulted in hardly implementing a function of networking the component equipment items.

In order to watch a video cassette, the conventional audio/video system has required a user not only to press a "play" button on the VCR but also to turn on a power switch of the TV. And, if the TV and VCR communicate a video and an audio signal with each other through an AV-connected path, the system has also required the user to switch an input mode into "a video mode", and if they communicate these signals through an RF-connected path, to switch the TV channel to a VCR-leased channel.

Also, a TV tuner does not normally have channel numbers matching those of a VCR tuner. It has resulted in frequently bringing about inadvertent operational failures, for example, recording a program on a TV channel the user does not intend, even though he operates the VCR switch of the same VCR channel number as that which he is watching on the TV.

SUMMARY OF THE INVENTION

In order to overcome the foregoing shortcoming, therefore, it is a primary object of the invention to provide an audio/video system which provides TV and VCR control units in both the TV and VCR and connects both through an information path in a manner to allow a user to do the necessary TV operation on the VCR side for the purpose of watching a video cassette through the information path. That is, the invention makes it possible for him or her to watch a video cassette without any operation on the TV side.

It is a second object of the invention to provide an audio/video system which is capable of recording a TV program a user is now watching with only the VCR "record" operation. For implementing this function, the system is designed so that the VCR operational control unit picks up a TV channel number saved in a TV state storage unit and sets the VCR channel number to the TV channel number before starting the recording operation.

DESCRIPTION OF THE PREFERRED EMBODIMENTS

Figure 1:
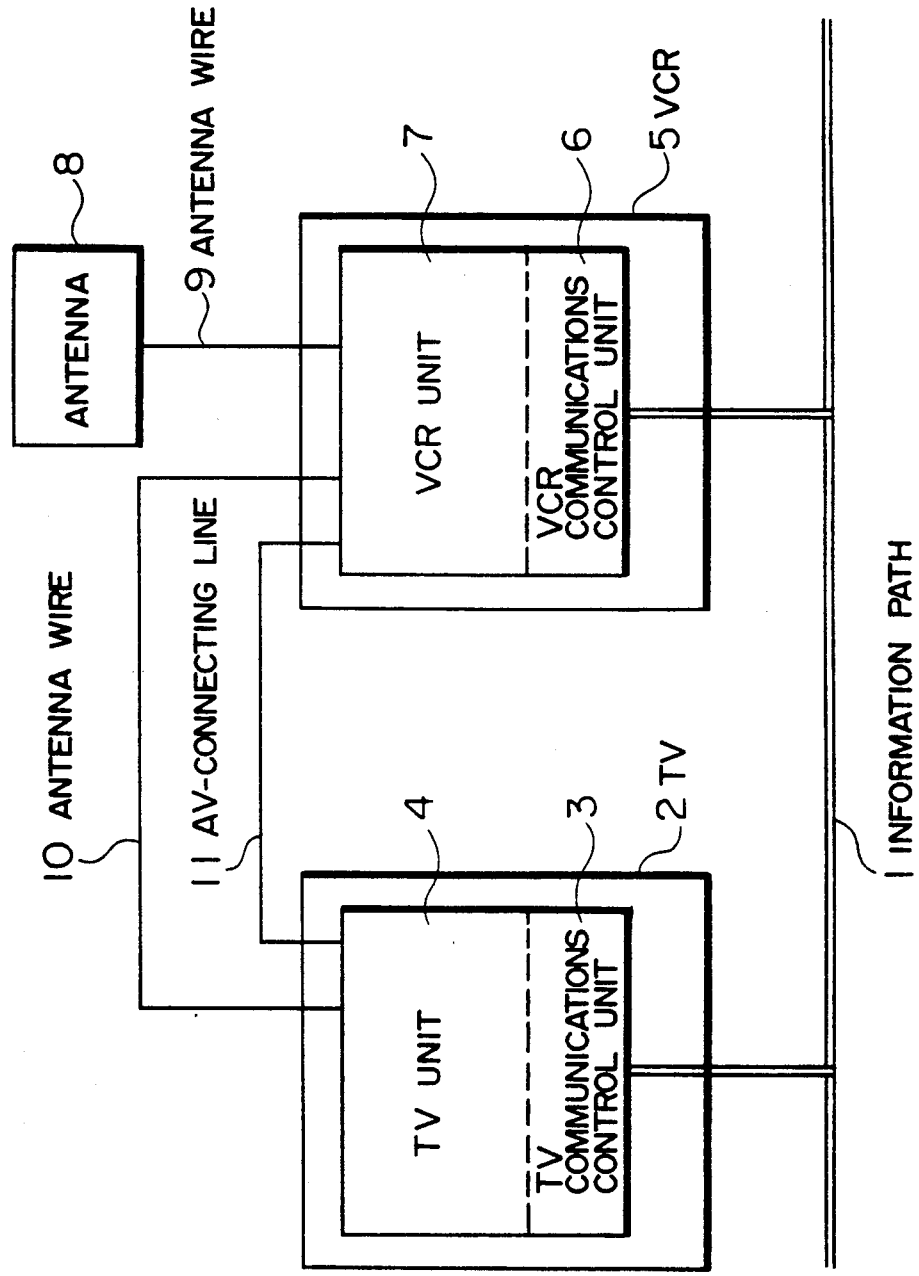
FIG. 1 is a schematic diagram showing an audio/video system according to the invention.

Hereinafter, a preferred embodiment of the invention will be set forth in order of the following four sections with reference to the drawings.
1) Schematic Description of the System
2) Schematic Description of the Invention
3) Detailed Description of a First Embodiment of the Invention
4) Detailed Description of a Second Embodiment of the Invention 1) Schematic Description of the Invention (a) Definition The subject audio/video system comprises audio and video equipment items such as a TV and a VCR, which are mutually connected through a communication system providing transparency and code independency. In this system, information is transmitted as a variable length unit referred to as a frame. A physical mechanism transmitting or receiving information is referred to as a communications control device (referred to as a communication control unit if it is built in an audio/video equipment). A communication line carrying information from a communication control device to another device is referred to as an information path. The basic terms for describing the invention will be similarly set forth with reference to FIGS. 10 and 11.

Stations 1002 to 1005: denote equipment items providing a data communication function between stations through an information path 1001.

Master: denotes a station grasping a control right at a time point on the communication system.

Slave: denotes a station which is specified by a master at a time point and must respond to the master.

Transmitter: denotes a station which transmits data contained within a message field in a frame.

Receiver: denotes a station which receives data contained within a message field in a frame.

Write Sequence: denotes a sequence which transmits a command or data from a master served as a transmitter to a slave. It includes two kinds, write command sequence and write data sequence.

Read Sequence: denotes a sequence which collects data from a slave to a master served as a receiver.

Frame 1110: denotes a unit at which information is transmitted from a station to another station. It consists of a header field, a master field, a slave field, a control field, and a message field.

Mode Bit 1112: is used for delimiting a frame transfer speed and the number of bytes to be transferred in a message.

Header Field 1125: denotes an area which is used for delimiting an indication of a frame start and a frame mode.

Master Field 1126: denotes an area indicating an address of a master.

Slave Field 1127: denotes an area indicating an address of a slave and specified by a master.

Control Field 1128: denotes an area used for signifying a transmission direction of a message field in a frame and a content described in the message field and performing locking control. Table 1 (to be described later) describes the content to be signified and the locking control.

Message Field 1129: denotes a data area used for transmitting a message. This area makes it possible to serially transfer a plurality of blocks, one block comprising data bits (eight bits) 1121, one end-of-data bit 1122, one parity bit 1123, and one up bit 1124.

Arbitration: denotes a control process which serves to define a privilege when a plurality of stations try to start transmitting frames at the same time. It is executed during intervals of the head field 1125 and the master field 1126.

Locking Control: denotes a function specified to a slave by a master. Once a slave is locked, the slave cannot receive a frame with a content requiring to change the state of the slave from another master.

(b) Basic Structure of System

Figure 10:
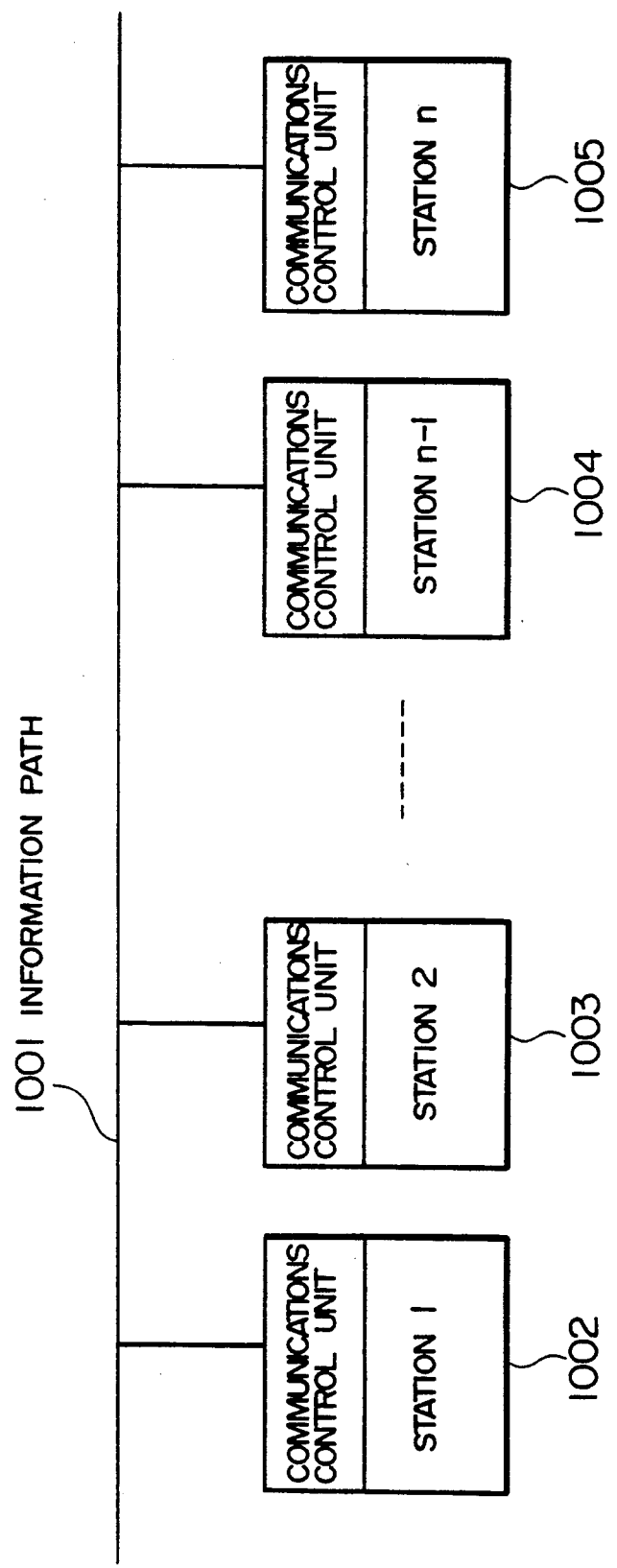
FIG. 10 is a fundamental schematic diagram showing a communication system applied to the invention.

FIG. 10 is a basic structure of a communications system applied to the present invention. A plurality of stations 1002, 1003, . . . , 1005 each providing a communication control unit are connected in one information path 1001. Each station corresponds to each audio or video equipment such as a VCR, TV, or CD player. For controlling an audio/video system comprising such group of audio and video equipment items, any equipment except those audio and video equipment items such as a tele-control unit may be inserted into the network. And no central control unit is assumed to be provided for collectively controlling the operation of an overall system.

(c) Frame Format and Basic Communications Procedure

Figure 11:
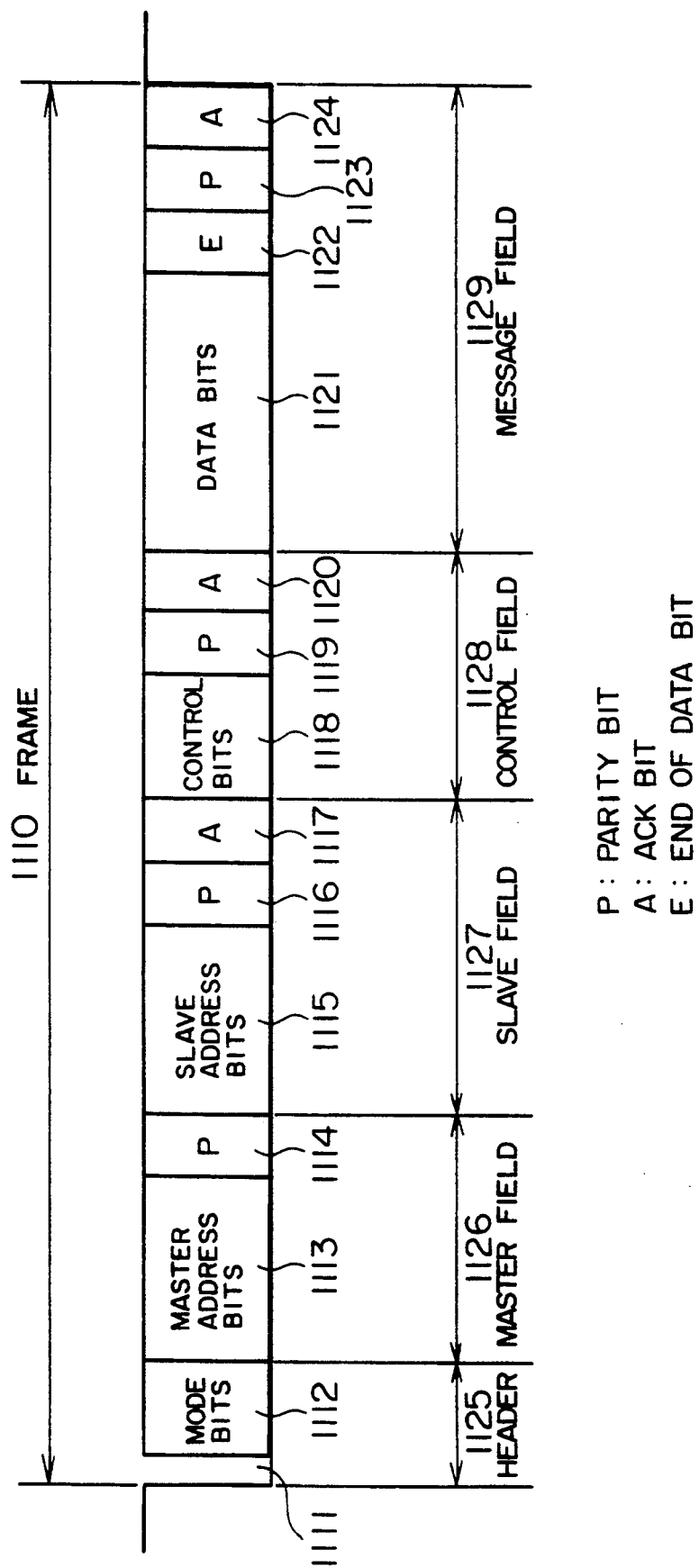
FIG. 11 is a frame format view showing the communication system applied to the invention.

FIG. 11 shows a frame format of a communication system applied to the invention. The frame comprises a header 1125, a master field 1126, a slave field 1127, a control field 1128, and a message field 1129. The header 1125 comprises a start bit 1111 indicating start of the frame and a mode bit 1112 transferring a mode indicating a transfer speed of the frame and what number of bytes can be transferred as a message. The master field 1126 comprises a 12-bit master address 1113 and one parity bit (P) 1114. The slave field 1127 comprises twelve slave address bits 1115, one parity bit (P) 1116, and one ACK bit (A) 1117. If a station is specified as a slave, the slave returns the ACK bit 1117 as an acknowledge signal to the master. In response to the ACK bit 1117 as an acknowledge signal, the master sequentially transmits the control field 1128 or later. Yet, in response to a negative acknowledge, the master cancels the transfer of frames. The control field 1128 comprises four control bits 1118, one parity bit (P) 1119, and one ACK bit (A) 1120. The control bits 1118 indicate a transmission direction of the message field 1129 in a frame, the signified content described in a message field, and locking control. The content of the control field is shown in Table 1.

TABLE 1

| Control Bit (1118) | Content | Locking | Data Transmission Direction |
|---|---|---|---|
| 0000 | read slave status | no locking | |
| 0001 | undefined | undefined | slave |
| 0010 | read slave status | locking | → master |
| 0011 | read data | locking | |
| 0100 | read locked address (middle and lower 4 bits) | no locking | |
| 0101 | read locked address (upper 4 bits) | no locking | |
| 0110 | read slave status | unlocking | |
| 0111 | read data | unlocking | |
| 1000 | write property memory address | locking | |
| 1001 | undefined | undefined | master |
| 1010 | write command | locking | → slave |
| 1011 | write data | locking | |
| 1100 | undefined | undefined | |
| 1101 | undefined | undefined | |
| 1110 | write command | unlocking | |
| 1111 | write data | unlocking | |

If the slave is enabled to accept control of the content specified by the control bit 1118 sent from the master, it returns the ACK bit 1120 as an acknowledge to the master. If it is disabled, it returns a negative acknowledge. In response to the ACK bit 1120 served as the negative acknowledge, the maser enters into a region of the message field 1129. In response to the negative acknowledge, the master cancels the transfer of frames. The message field 1120 comprises a plurality of blocks, each block including eight data bits 1121, one end-of-data bit 1122 indicating a final data bit of the message field, one parity bit 1123, and one ACK bit 1124. The station specified as a receiver by the control bit 1118 returns the ACK bit 1124 as an acknowledge or negative acknowledge to a transmitter each time it receives the end-of-data bit 1122. In response to the negative acknowledge, the transmitter cancels transmission of the message field.

The present system is capable of qualifying all the stations 1002 to 1005 as a master. The master-qualified station can specify a slave and control transmission start and timing of the frame 1110. All the stations 1002 to 1005 may be each qualified as a master and thus have a right to start transmission of the frame 1110, though only one master can occupy the information path 1001 at a time. Assuming that a plurality of masters try to transmit the frames, before the transmission, it is necessary to perform arbitration and determine a priority. The station to be served as a slave must be a station which is addressed by the slave address bit 1115 contained in the slave field 1127 of the frame 1110 transmitted from the master. The slave station has a duty to return a response 1117 to the master. Delimitation of a transmitter and a receiver is defined in the control field 1128 contained in the frame 1110. From the viewpoint of one station, the station is allowed to have four functions as a master transmitter, a master receiver, a slave transmitter, and a slave receiver.

2) Schematic Description of the Invention

FIG. 1 is a schematic diagram showing one embodiment of an audio/video system according to the invention. 1 denotes an information path, 2 denotes a TV, 3 denotes a TV communications control unit contained in the TV 2, and 5 denotes a VCR. 6 denotes a VCR communications control unit contained in the VCR 5. 8 denotes an antenna, and 9 and 10 denote antenna wires. TV 2 and VCR 5 communicate data with each other through the information path 1. The communicated data includes command packets for controlling a component and a state-reading packet for reading the state of a component. When a video signal and an audio signal are sent from the VCR 5 to the TV 2, these signals pass through an AV-connecting line 11 in case of the AV connection and the antenna wires 9, 10 in case of the RF connection.

Figure 2:
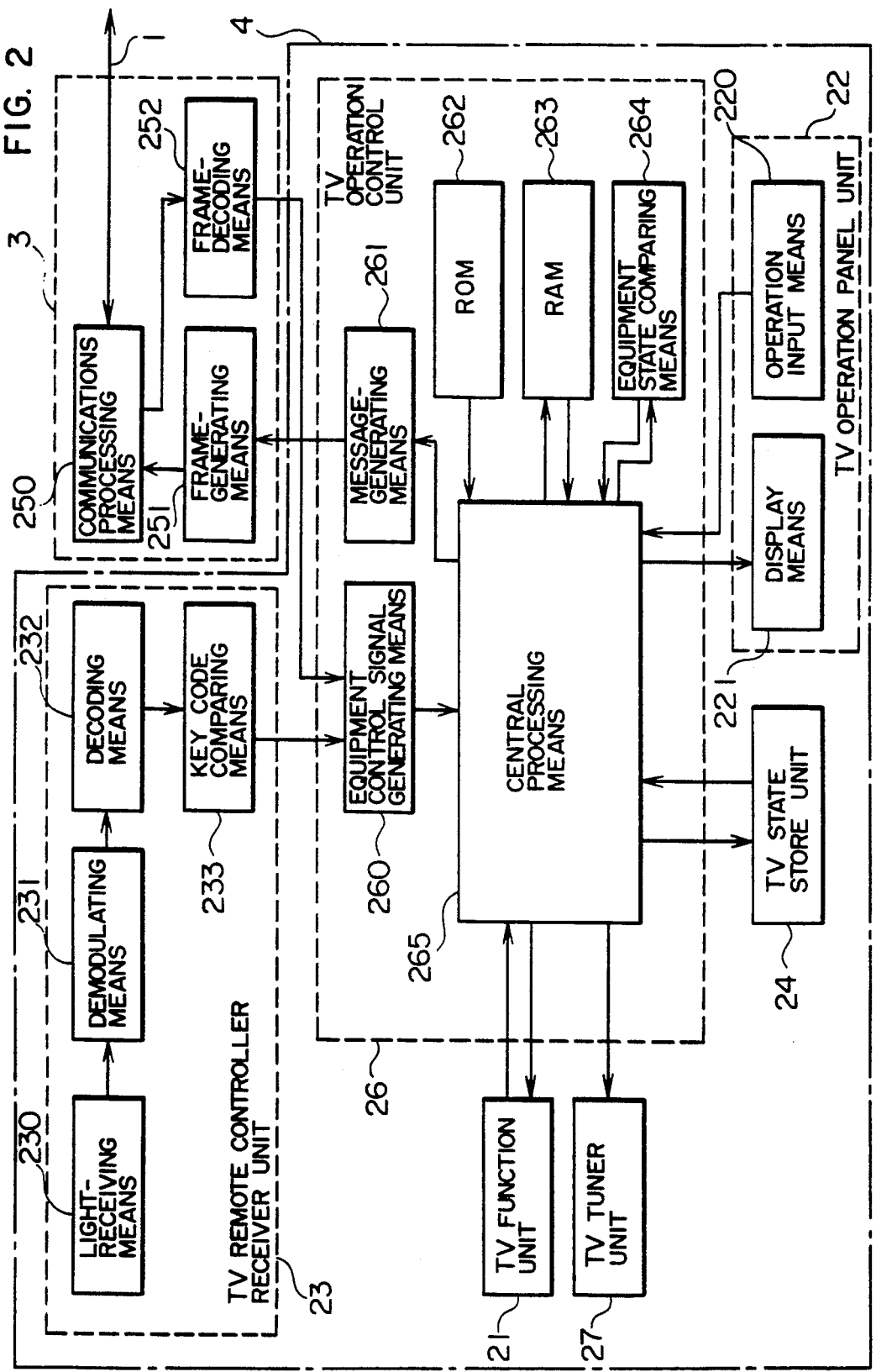
FIG. 2 is a schematic diagram showing a television receiver (TV) applied to the invention.

FIG. 2 is a block diagram showing the TV 2, in particular a TV unit 4 in FIG. 1. 21 denotes a TV function unit and 22 denotes a TV operation panel unit. The TV operation panel section 22 consists of an operation input means 220 and a display means 221. The operation input means 220 is used in operating the TV 2 and the display means 221 is used when the TV 2 displays information. 23 denotes a TV remote controller receiver unit, which comprises a light-receiving means 230, a demodulating means 231, a decoding means 232, and a key code comparing means 233. For example, an infrared signal sent from an infrared remote controller unit (not shown) is received by the light-receiving means 230 and converted into an electric signal, which is then input into the demodulating means 231. The demodulator circuit 231 demodulates the input electric signal into a data bit sequence and then sends the result into the decoding means 232. The decoding means 232 serves to group the input data bit sequence at each significant unit and then is input as an instruction key code into the key code comparing means 233. The key code comparing means 233 compares the input key code with a stored key code in order to determine if the data is intended for the equipment (TV 2) and the content of the instruction contained in the key code and then enters into an instruction control signal generating means 260 built in the TV control unit 26. 24 denotes a TV state store unit and 13 denotes a TV communications control unit. When communications frames are received from another equipment, these communications frames are sent from the information path 1 to a communications processing means 250. Then, the means 250 demodulates the input data into an electronic signal and then sends the signal to the frame-decoding means 252. The means 252 decodes the input signal and then sends it to the equipment control signal generating means 260 contained in the TV control unit 26. In order to send the communications frame into another equipment, a message-generating means 261 contained in the TV control unit 26 generates a message and changes the message input into the frame-generating means 261 into a communications frame. The frame is input into the communications processing means 250 in which the frame is subject to necessary conversion and then is sent out through the information path 1. 26 denotes the TV control unit which includes several functions of receiving indications sent from the TV operation panel section 22 and the TV remote controller receiver unit 23, controlling the TV function unit 21, managing the content of the TV state store unit 24, and performing communications with another audio/video equipment (VCR 5 in this embodiment) through the TV communications control unit. The TV control unit comprises the equipment control signal generating means 260, the message generating means 261, a read-only memory (ROM) 262, a random access memory (RAM) 263, an equipment state comparing means 264, and a central processing means 265. The central processing means 265 consists of a microcomputer and executes several processing operations in accordance with a program saved in the ROM 262. The equipment state comparing means 264 serves to compare the current state of its relevant equipment (TV 2) with a desired state and to another equipment (VCR 5) with a desired state. The equipment control signal generating means 260 generates a signal for controlling an equipment in accordance with the instruction input from the TV remote controller receiver unit and sends the signal to the central processing means 265. The message-generating means 261 serves to generate a message of a format predefined in transferring an instruction or the like into another audio/video equipment. 27 denotes a TV tuner unit. 21 denotes the TV function unit which implements the original TV operation and function.

Figure 3:
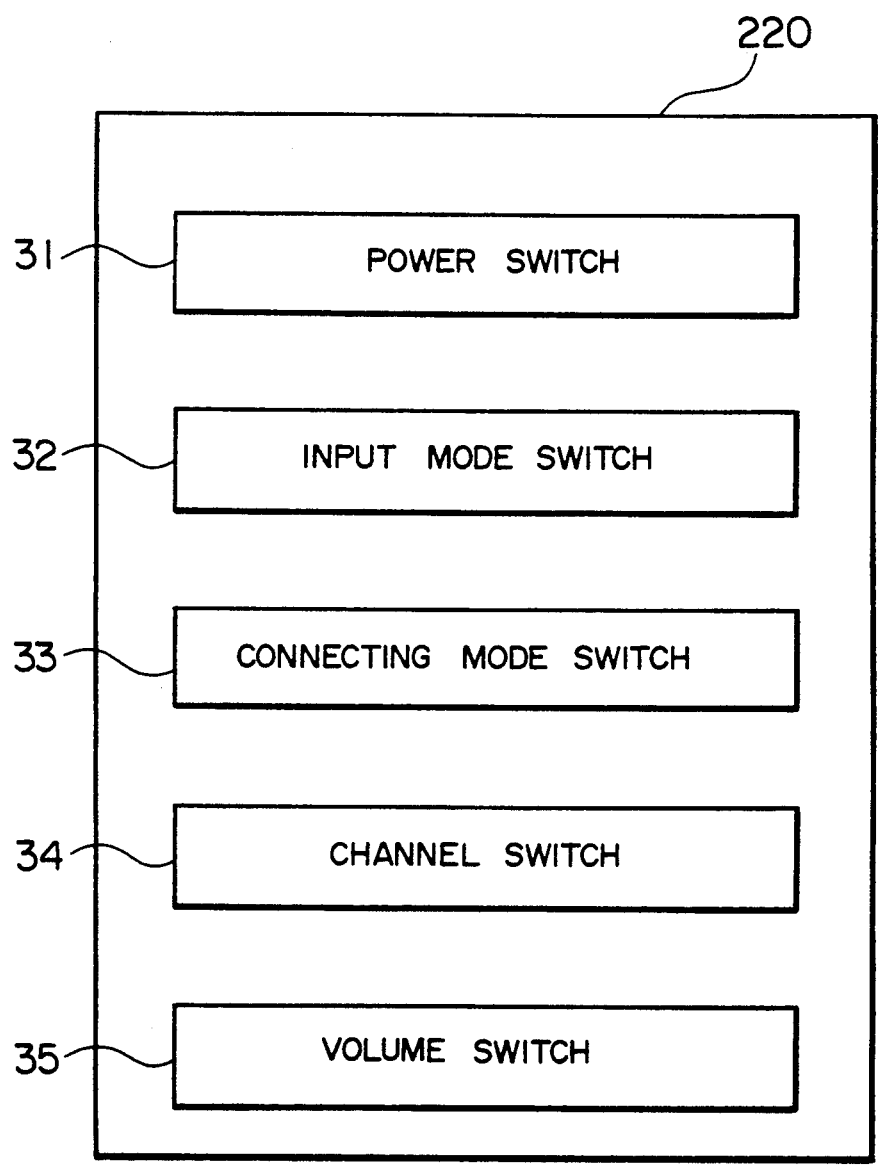
FIG. 3 is a schematic diagram showing a TV-operating input means.

FIG. 3 is a concrete schematic diagram showing the operation input means 220. 31 denotes a power switch, 32 denotes an input mode switch, 33 denotes a connection mode switch, 34 denotes a channel switch, and 35 denotes a volume switch. The input mode switch 32 serves to switch a signal source of a video signal to be displayed on the TV screen and switches several inputs such as a tuner input or a video input. The connection mode switch 33 is used for indicating the type of a transmitting method of a video/audio signal from the VCR 5 to the TV 2, that is, an AV-connection or RF-connection.

Figure 4:
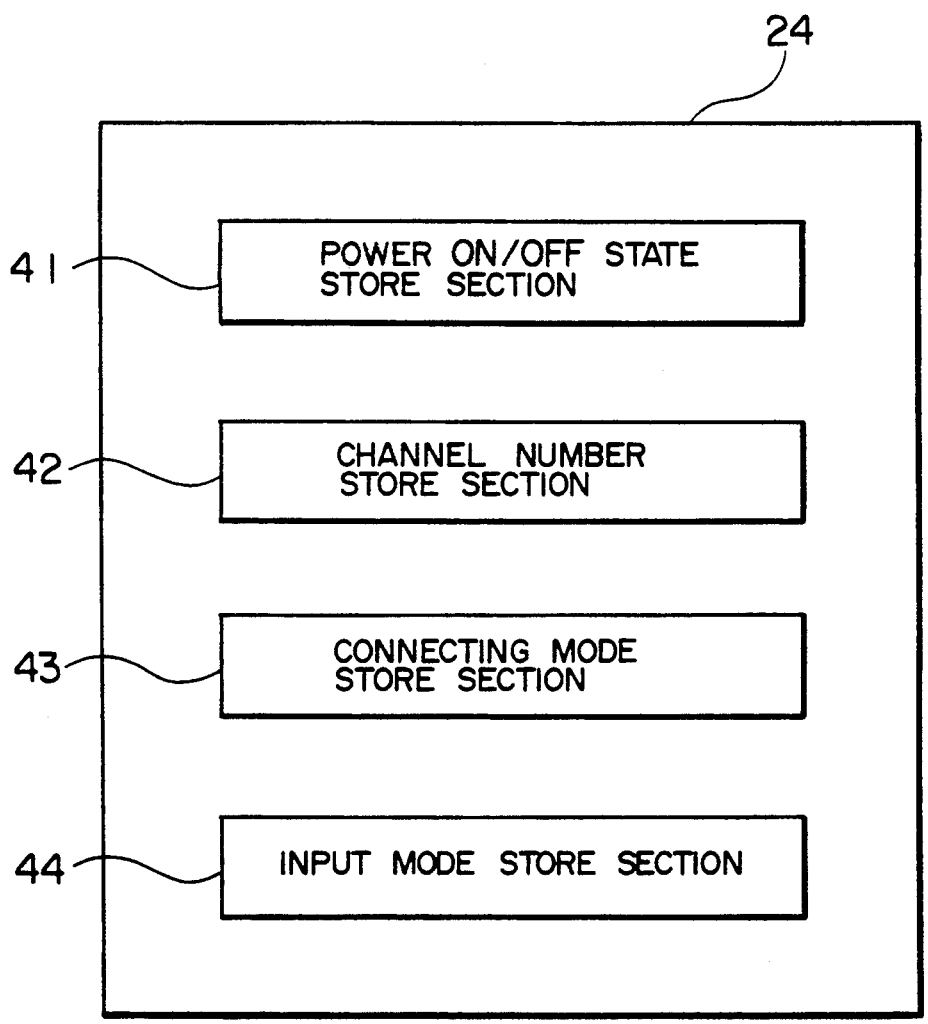
FIG. 4 is a schematic diagram showing a TV state storage unit.

FIG. 4 is a schematic diagram showing the TV state store unit 24. 41 denotes a power ON/OFF state store section for storing if the power is turned on, 42 denotes a channel number store section for storing a TV channel number currently being received, 43 denotes a connection mode store section for storing a connecting method between the TV 2 and VCR 5, that is, the AV-connection or RF-connection, 44 denotes an input mode store section for storing a transmitting unit of the input video signal, that is, the TV tuner unit 24 or VCR 5 and the input mode store section serves to store data set by the operation input means 220. And, the content of each store section 41 to 44 can be read out from the audio/video equipment through the TV communications control unit 3.

Figure 5:
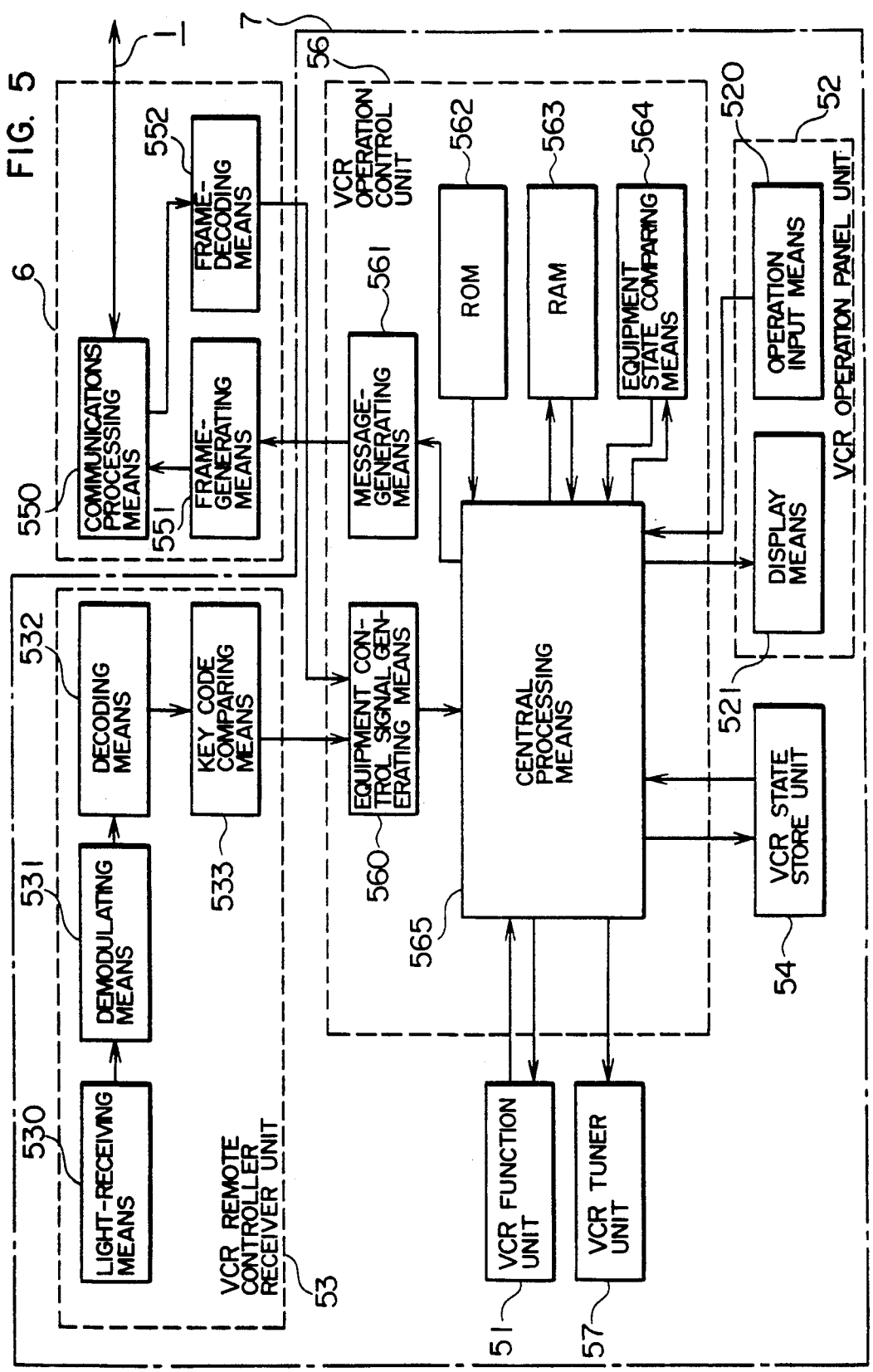
FIG. 5 is a block diagram showing a video cassette recorder (VCR) applied to the invention.

FIG. 5 is a block diagram showing the VCR 5, in particular, the VCR unit 7 shown in FIG. 1. 51 denotes a VCR function unit, and 52 denotes a VCR operation panel unit. The VCR operation panel unit 52 consists of an operation input means 520 and the display 521. The operation input means 520 is used when a user operates the VCR 5, the display means 521 is used when the VCR 5 displays information against the user. 53 denotes a VCR remote controller receiver unit which comprises a light-receiving means 530, a demodulating means 531, a decoding means 532, and a key code comparing means 533. For example, an infrared signal sent from an infrared remote controller unit (not shown) is received by the light-receiving means 530 and converted into an electric signal, which is then input into the demodulating means 531. The demodulator circuit 531 demodulates the input electric signal into a data bit sequence and then sends the result into the decoding means 532. The decoding means 532 serves to group the input data bit sequence at each significant unit and then is input as an instruction key code into the key code comparing means 533. The key code comparing means 533 compares the input key code with a stored key code in order to determine if the data is intended for the equipment (VCR 5) and the content of the instruction contained in the key code and then enters into an instruction control signal generating means 56 built in the VCR control unit 56. 54 denotes a VCR state store unit and 6 denotes a VCR communications control unit. When communications frames are received from another equipment, these communications frames are sent from the information path 1 to a communications processing means 550. Then, the means 550 demodulates the input data into an electronic signal and then sends the signal to the frame-decoding means 552. The means 552 decodes the input signal and then sends it to the equipment control signal generating means 560 contained in the VCR control unit 56. In order to send the communications frame into another equipment, a message-generating means 561 contained in the VCR control unit 56 generates a message and changes the message input into the frame-generating means 561 into a communications frame. The frame is input into the communications processing means 550 in which the frame is subject to necessary conversion and then is sent out through the information path 1. 56 denotes the VCR control unit which includes several functions of receiving indications sent from the VCR operation panel unit 52 and the VCR remote controller receiver unit 53, controlling the VCR function unit 21, managing the content of the VCR state store unit 54, and doing communications with another audio/video equipment (TV 2 in this embodiment) through the VCR communications control unit. The VCR control unit comprises the equipment control signal generating means 560, the message generating means 561, a read-only memory (ROM) 562, a random access memory (RAM) 563, an equipment state comparing means 564, and a central processing means 565. The central processing means 565 consists of a microcomputer and executes several processing operations in accordance with a program saved in the ROM 562. The equipment state comparing means 564 serves to compare the current state of its relevant equipment (VCR 5) with a desired state and to another equipment (TV 2) with a desired state. The equipment control signal generating means 560 generates a signal for controlling an equipment in accordance with the instruction input from the VCR remote controller receiver unit 6 and sends the signal to the central processing means 565. The message-generating means 561 serves to generate a message of a format predefined in transferring an instruction or the like into another audio/video equipment.

Figure 6:
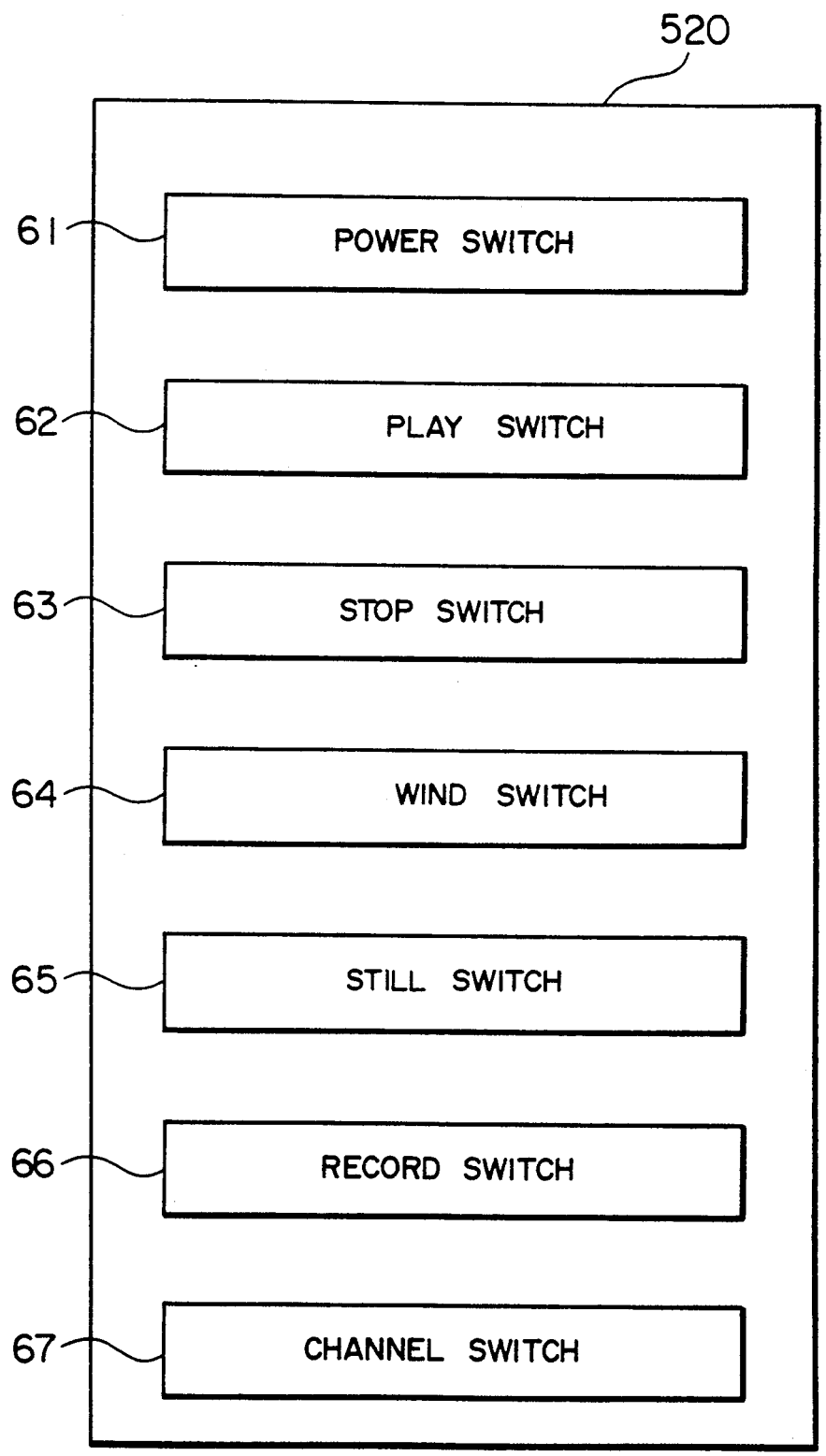
FIG. 6 is a schematic diagram showing a VCR-operating input means.

FIG. 6 is a concrete schematic diagram showing an operation input means 520. 61 to 67 are used for operating any function button such as a "play" or "stop" button.

Figure 7:
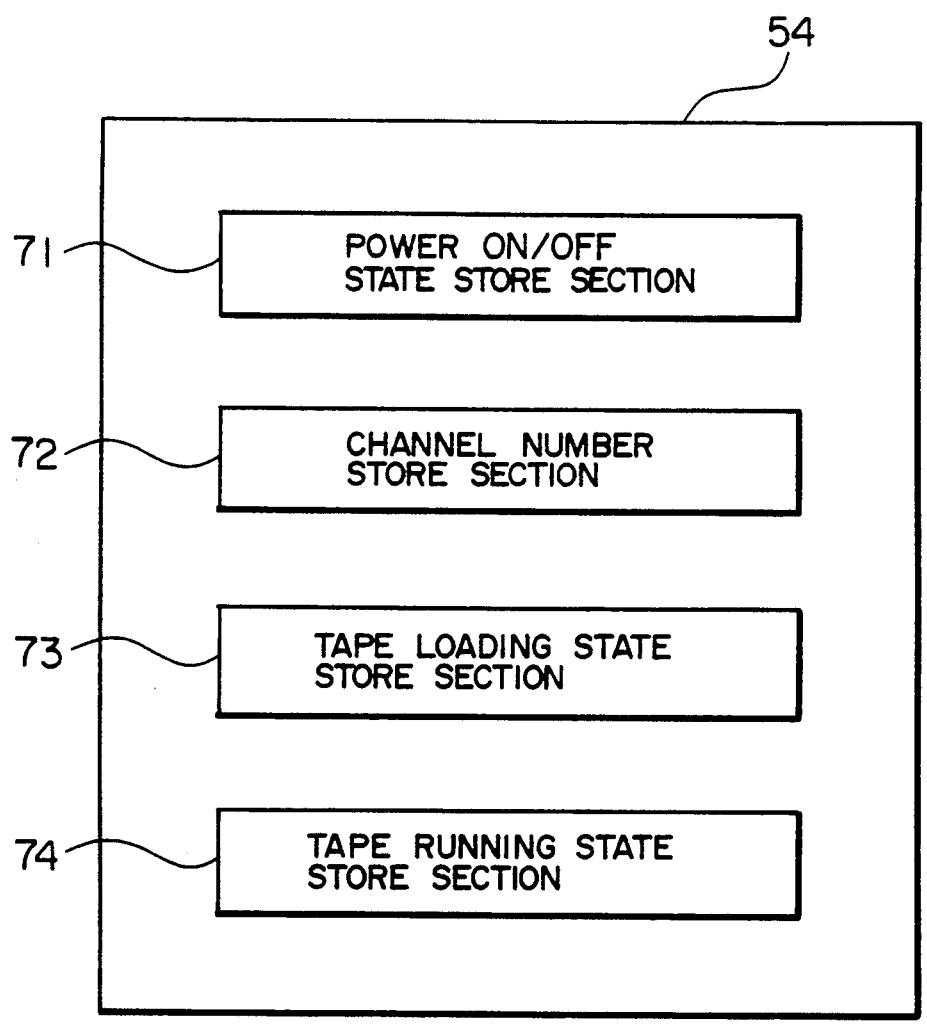
FIG. 7 is a block diagram showing a state storage unit included in a VCR.

FIG. 7 is a block diagram showing the VCR state store unit 54. 71 denotes a power ON/OFF state store section for storing the power state, that is, ON or OFF, 72 denotes a channel number store section for storing a VCR channel number currently being received, 73 denotes a tape loading state store section for storing a tape loading state, and 74 denotes a tape running state store section for storing a video cassette tape running state. Like the TV state store unit 24, the content of each state store section 71 to 74 is allowed to be read out of another audio/video equipment through the VCR communications control unit 6.

3) Detailed Description of First Embodiment of the Invention

At an initial state of the procedure in the present embodiment, the TV 2 power remains "OFF". The VCR 5 power may be in any state of "ON" or "OFF", but a video cassette tape must be loaded to the VCR 5. Whether or not the tape is loaded therein depends on the data contained in the tape loading state stored section 73.

Figure 8:
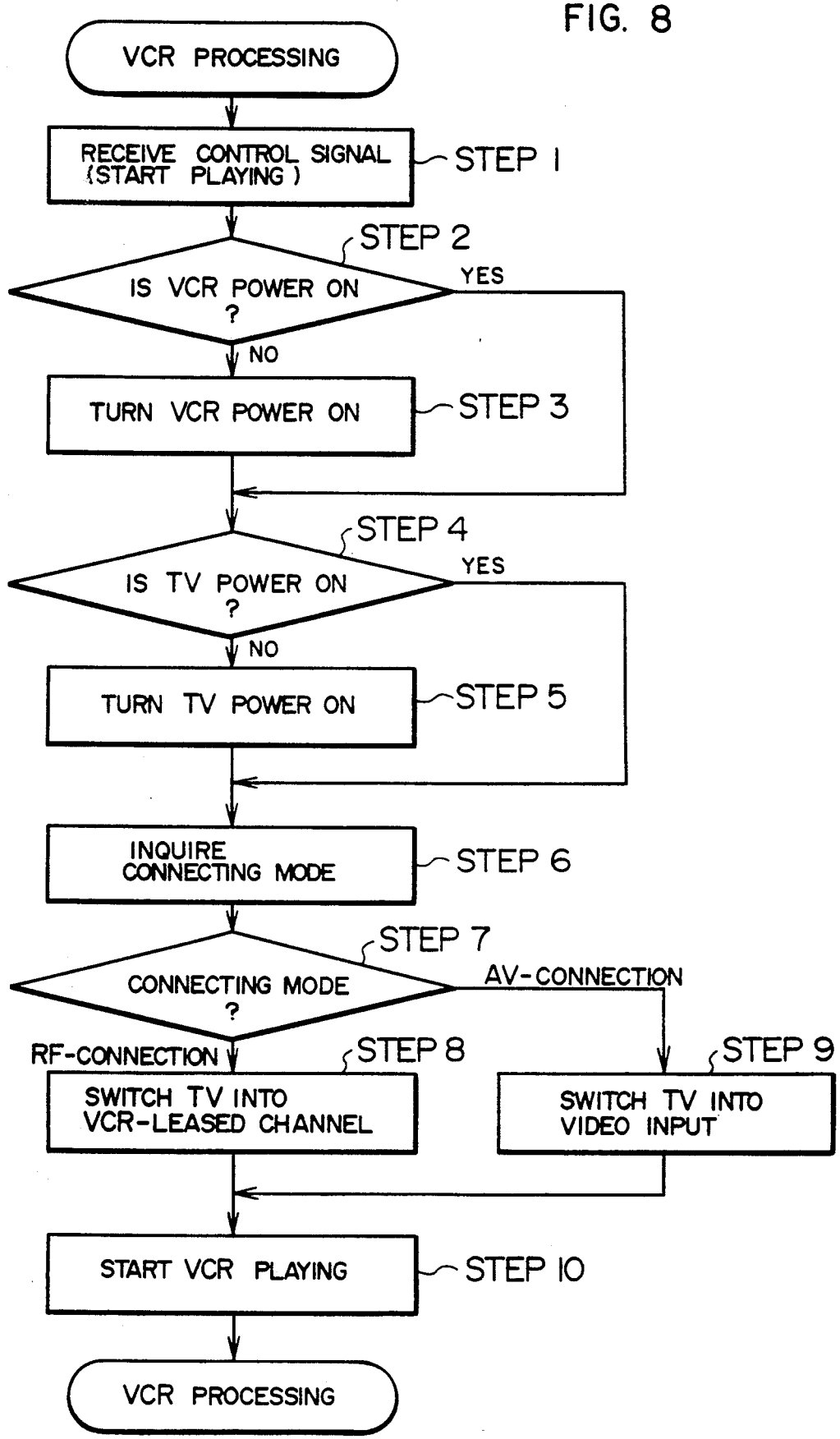
FIG. 8 is a flowchart showing a procedure of the VCR.

Next, the procedure executed later than the initial state will be set forth with reference to FIG. 8.

(Step 1)

At the foregoing initial state, a user operates a "play" button of a video cassette tape recorder using a play switch 62 built in the operation input means 520 of the VCR operation panel unit 52 or an infrared remote controller (not shown) through the VCR remote controller receiver unit 53. Using the infrared remote controller, the received optical control signal is converted into an electric signal in the light-receiving means 530. The resulting electric signal is demodulated and decoded in the demodulating means 531 and the decoding means 532 and then is sent to the key code comparing means 533. The means 533 determines which instruction the received signal matches to and then the equipment control signal generating means 560 generates an equipment control signal matching to the instruction, which is sent to the central processing means 565. If the received instruction indicates a play start instruction of the VCR 5, the step 2 or later is executed. If it indicates the other, as a matter of course, the description about the later process is left out, because it is irrelevant to the invention.

(Step 2)

The central processing means 565 of the VCR operation control unit 56 reads the state out of the power ON/OFF state store section 71 and the equipment state comparing means 564 determines the current state. If the current power state of the VCR 5 is "ON", the process goes to a step 4. If it is "OFF", it goes to a step 3.

(Step 3)

This step controls a power of the VCR function unit 51 to be on.

(Step 4)

Next, in order to check for the power state ON or OFF of the TV 2, the central processing means 56 in the VCR operation control section 56 serves to control the message-generating means 561 to generate a message used for reading a TV power state and then transmit it to the TV 2 through the communications control means 550 and the information path 1. For the TV 2 side, the message passes through the communications control means 250, the frame-decoding means 252, and the equipment control signal generating means 260 and finally reaches the central processing means 265. In response to the message, the central processing means reads out a power state of the TV 2 from the power state store section 41 of the TV state store unit and sends it back to the VCR 5 through the reverse path to the above. If the above processing makes sure that the TV power is "ON", the process goes to a step 6, and if it is "OFF", the process goes to a step 5.

(Step 5)

This step serves to transmit the instruction turning on the TV power to the TV 2 through the message-generating means 561, the frame-generating means 551, the communications control means 550, and the information path 1 in a manner to control the TV power to be on.

(Step 6)

Then, in order to check for a connection mode provided between the TV 2 and the VCR 5, the VCR 5 instructs the message-generating means 561 to generate a message for reading the connection mode and send it to the TV 2 through the frame-generating means 551 of the VCR communications control unit 6, the communications control means 550, and the information path 1. For the TV side, the message passes through the communications control means 256, the frame-decoding means 252, and the equipment control signal generating means 260 and then finally reaches the central processing means 265. In response to the message, the central processing means 265 reads the current connection mode provided between the TV 2 and the VCR 5 out of the connection mode store section 43 contained in the TV state store means 24 and sends it back to the VCR 5 through the reverse path to the above. The content of the connection mode store section 43 is set by the connecting state switch 33 provided on the TV operation panel unit 22. If the readout connecting mode indicates an AV-connecting state, the process goes to a step 9, and if it indicates an RF-connecting state, the process goes to a step 8.

(Step 8)

This step is executed only if the RF-connecting state is provided between the TV 2 and the VCR 5. The RF-connection indicates a mode at which audio/video signals output from the VCR 5 are RF-modulated and sent to the TV 2 through the antenna line 10. Since the TV 2 has a predefined VCR-leased channel, the VCR 5 sends an instruction for switching the TV channel to the VCR-leased channel to the TV 2 through the message-generating means 561, the frame-generating means 551, the communications control means 550, and the information path 1 in order to control switching of the TV channel.

(Step 9)

This step is executed only if an AV-connecting state is provided between the TV 2 and the VCR 5. The AV-connection indicates a mode at which the audio/video signals output from the VCR 5 are sent to an AV input of the TV 2 through the AV-connection line 11. The VCR 5 sends the instruction for switching the TV input mode to the TV 2 through the message-generating means 561, the frame-generating means 551, the communications control means 550, and the information path 1 in order to switch an input mode of the TV 2.

(Step 10)

The execution of the foregoing process has allowed the TV 2 to be set in a state for outputting a video/audio signal of the VCR 5, thereby the VCR operation control unit 56 controls the VCR function unit 51 to play the VCR 5. Further, the execution of the foregoing process also has enabled the user to watch and listen to the video cassette tape by operating the "play" switch of the VCR without operating the TV 2.

The VCR function unit 51 requires several seconds from when it is set in the "play" state to when the actual image and audio are outputted. Hence, the overall processing time is reduced more if the process (step 10) of the VCR "play" start control given from the VCR operation control unit 56 to the VCR function unit 51 is executed immediately after the VCR power ON control (step 3), which procedure has been executed in the foregoing process.

Further, at the step 9, it may be possible to give reference to the data (tuner or video input) stored in the input mode store section 44 of the TV state store unit 24 for switching the input mode to the video input if the stored data is the tuner input or maintaining it if it is the video input.

4) Detailed Description of a Second Embodiment of the Present Invention

Next, a description will be directed to the process of the audio/video system according to a second embodiment of the invention.

At the initial processing state in this embodiment, the TV 2 is powered "ON" and the VCR 5 is powered "OFF". Yet, the VCR 5 may be powered "ON".

Figure 9:
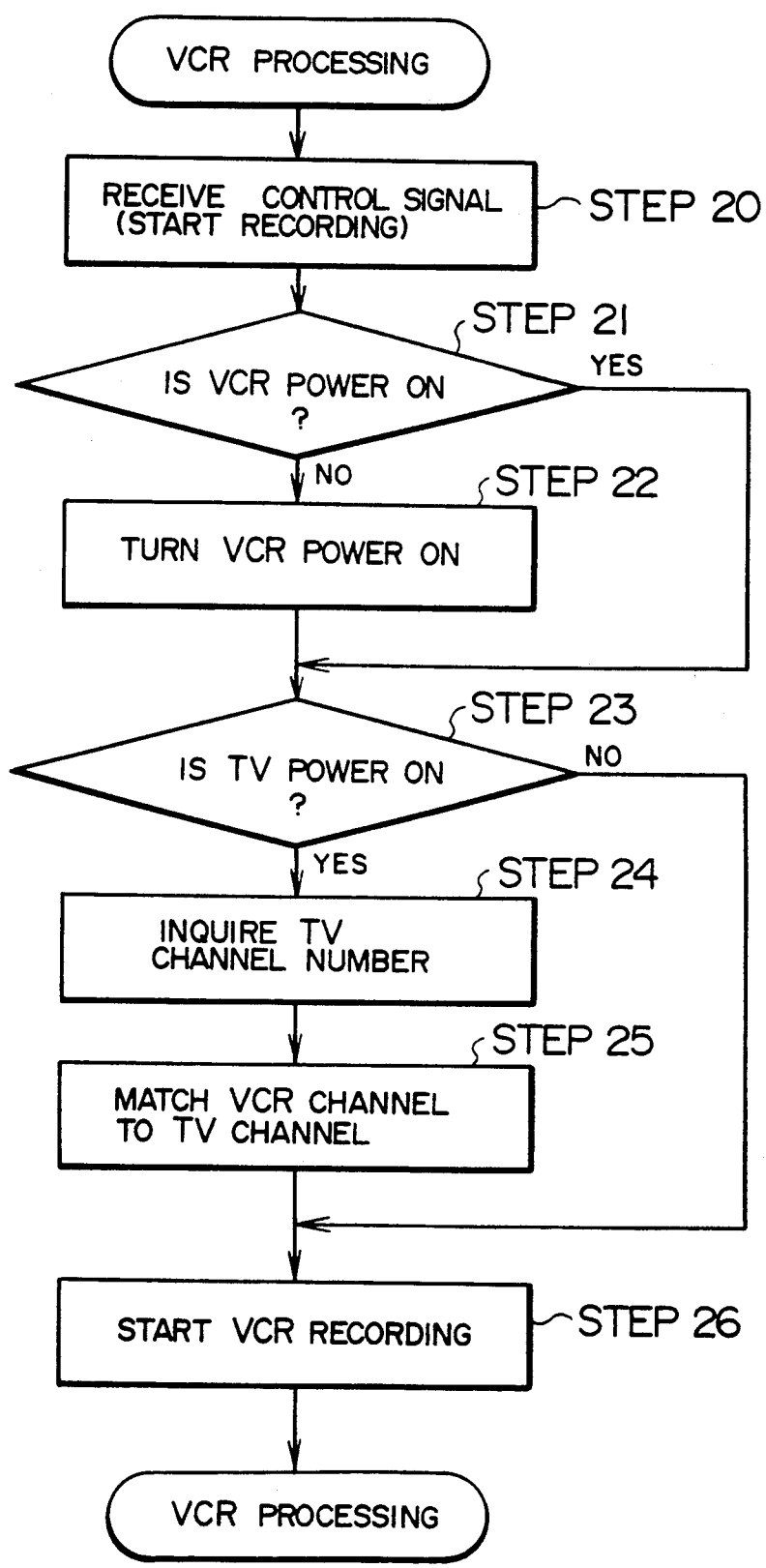
FIG. 9 is a flowchart showing another procedure of the VCR.

The process after the initial state will be set forth with reference to FIG. 9.

(Step 20)

At the foregoing initial state, if the TV tuner 27 is set to a desired channel when a user is watching the TV 2, for recording a program on the currently-selected channel, the user operates a "record" button of the VCR 5 using a record switch 64 built in the VCR operation input means 520 or an infrared remote controller (not shown) through the VCR remote controller receiver unit 53. Using the infrared remote controller, the received optical control signal is converted into an electric signal in the light-receiving means 530. The resulting electric signal is demodulated and decoded in the demodulating means 531 and the decoding means 532 and then is sent to the key code comparing means 533. The means 533 determines which instruction the received signal matches to and then the equipment control signal generating means 560 generates an equipment control signal matching to the instruction, which is sent to the central processing means 565. If the received instruction indicates a record-starting instruction of the VCR 5, the step 21 or later is executed. If it indicates the other, as a matter of course, the description about the later process is left out, because it is irrelevant to the invention.

(Step 21)

The central processing means 565 of the VCR operation control unit 56 reads the state out of the power ON/OFF state store section 71 and the equipment state comparing means 564 determine the current state. If the current power state of the VCR 5 is "ON", the process goes to a step 23. If it is "OFF", it goes to a step 22.

(Step 22)

This step controls a power of the VCR function unit 51 to be on.

(Step 23)

Next, in order to check for the power state ON or OFF of the TV 2, the central processing means 56 in the VCR operation control section 56 serves to control the message-generating means 561 to generate a message used for reading a TV power state and then transmit it to the TV 2 through the communications control means 550 and the information path 1. For the TV 2 side, the message passes through the communications control means 250, the frame-decoding means 252, and the equipment control signal generating means 260 and finally reaches the central processing means 265. In response to the message, the central processing means 265 reads out a power state of the TV 2 from the power state store section 41 of the TV state store unit and sends it back to the VCR 5 through the reverse path to the above. If the above processing makes sure that the TV power is "ON", the process goes to a step 24, and if it is "OFF", the process goes to a step 26.

(Step 24)

At this step, in order to read the channel number of the tuner section 27 of the TV 2 being currently watched, the message-generating means 561 generates a message for reading a channel number of the TV 2 and then sends it to the TV 2 through the VCR communications control unit 76, the frame-generating means 551, the communications control means 550, and the information path 1. For the TV 2, the central processing means 265 receives the message through the communications control means 250, the frame-decoding means 252, and the equipment control signal generating means 260. In response to the message, the means 265 reads the currently-selected channel number of the tuner section 27 of the TV 2 from the content of the channel number store section 42 of the TV state store unit 24 and sends it back to the VCR 5 through the reverse path to the above.

(Step 25)

The central processing means 565 of the VCR operation control unit 56 serves to set the channel of the VCR tuner section 57 to be equal to the currently-selected channel number of the TV tuner section 27, which is returned from the TV operation control unit 26. This operation allows the currently-selected channel of the TV tuner to be equal to the channel number of the tuner 57 of the VCR 5 for recording the program on the channel.

Lastly, the VCR operation control unit 56 serves to control the VCR function unit 51 to start a "record" operation.

Moreover, at the step 22, it may be determined that a video cassette tape remains loaded on the data read out of the tape loading state store section 73 of the VCR state store unit 54. In this case, the step 23 or later may be cancelled for indicating on the TV display a mark or the like representing that the tape is not loaded into the VCR 5. At this time, these operations may be executed in the TV operation control unit 26 and the VCR operation control unit 56.

The foregoing process allows the user, if he or she is watching TV, to properly record the currently-selected channel program on the TV 2 without powering the VCR 5 on or re-setting the VCR channel number. And if the TV 2 is powered off, the VCR 5 starts to record the program on the channel set by the tuner 57.

In addition, this embodiment has been described with respect to the audio/video system consisting of a TV and a VCR. The invention is not limited to such system, but may employ a system consisting of other audio and video equipment items such as a CD player, a video disk, or an amplifier.

I claim:

1. An audio/video system including:
an information path for data communications, a television, and a video cassette recorder connected to said television through said information path,
said television comprising:
a television communication control unit for executing data communications between said video cassette recorder and said television itself through said information path,
a television operation control unit for controlling the operation of said television based on data input from said television operation control unit to said television communication control unit or for controlling said television communication control unit so as to output data to said video cassette recorder, and
a television state storing unit for storing data indicating a connecting state between said television and said video cassette recorder, said connecting state comprising an RF-connection or an AV-connection,
said video cassette recorder comprising:
a video cassette recorder communication control unit for executing data communication between said television and said video cassette recorder through said information path, and
a video cassette recorder operation control unit for reading said data from said television state storing unit and controlling the operation of said video cassette recorder based on the read-out data or for controlling said video cassette recorder communication control unit so as to output data to said television operation control unit,
said video cassette recorder operation control unit instructing said television operation control unit, in response to said video cassette recorder receiving a "play" operation command, to (i) turn on said television through said video cassette recorder communication control unit, said information path, and said television communication control unit, (ii) read out and evaluate data about the connecting state between said television and said video cassette recorder from said television state storing unit, and (iii) if said television operation control unit determines in operation (ii) that an RF-connection exists, switch a channel to which said television is tuned to a channel for watching a video played by said video cassette recorder, or (iv) if said television operation control unit determines in operation (ii) that an AV-connection exists, switch a line input mode of said television into an input mode for said video cassette recorder.

2. A system according to claim 1 wherein said television and said video cassette recorder each includes a common remote controller receiver section and a common remote controller unit, said receiver section receiving a control signal from said remote controller unit.

3. An audio/video system including:
an information path for data communication, a television, and a video cassette recorder connected to said television through said information path,
said television comprising:
a television communication control unit for executing data communication between said video cassette recorder and said television through said information path,
a television operation control unit for controlling the operation of said television based on data inputted from said television operation control unit to said television communication control unit or for controlling said television communication control unit so as to output data to said video cassette recorder, and
a television state storing unit for storing data relating to a channel number presently being watched on said television,
said video cassette recorder comprising:

a video cassette recorder communication control unit for executing data communication between said television and said video cassette recorder through said information path, and a video cassette recorder operation control unit for reading data from said television state store unit and controlling the operation of said video cassette recorder based on the read-out data or controlling said video cassette recorder communication control unit so as to output data to said television operation control unit, said video cassette recorder operation control unit, in response to said video cassette recorder receiving a "record" operation command, functioning to (i) read out said data relating to said channel number presently being watched on said television from said television state storing unit through said video cassette recorder communication unit, said information path, and said television communication control unit and (ii) match a channel number on said video cassette recorder to the read-out channel number on said television and then start and control the "record" operation.

4. A system according to claim 3 wherein said television and said video cassette recorder include a common remote controller receiver unit and a common remote controller unit, said receiving unit receiving a control signal from said remote controller unit.

* * * * *